Inventor:
John V. Cook
By Bair and Freeman
Attorneys.

July 14, 1942.  J. V. COOK  2,289,629
OVEN CONSTRUCTION
Filed Jan. 21, 1941   3 Sheets-Sheet 2
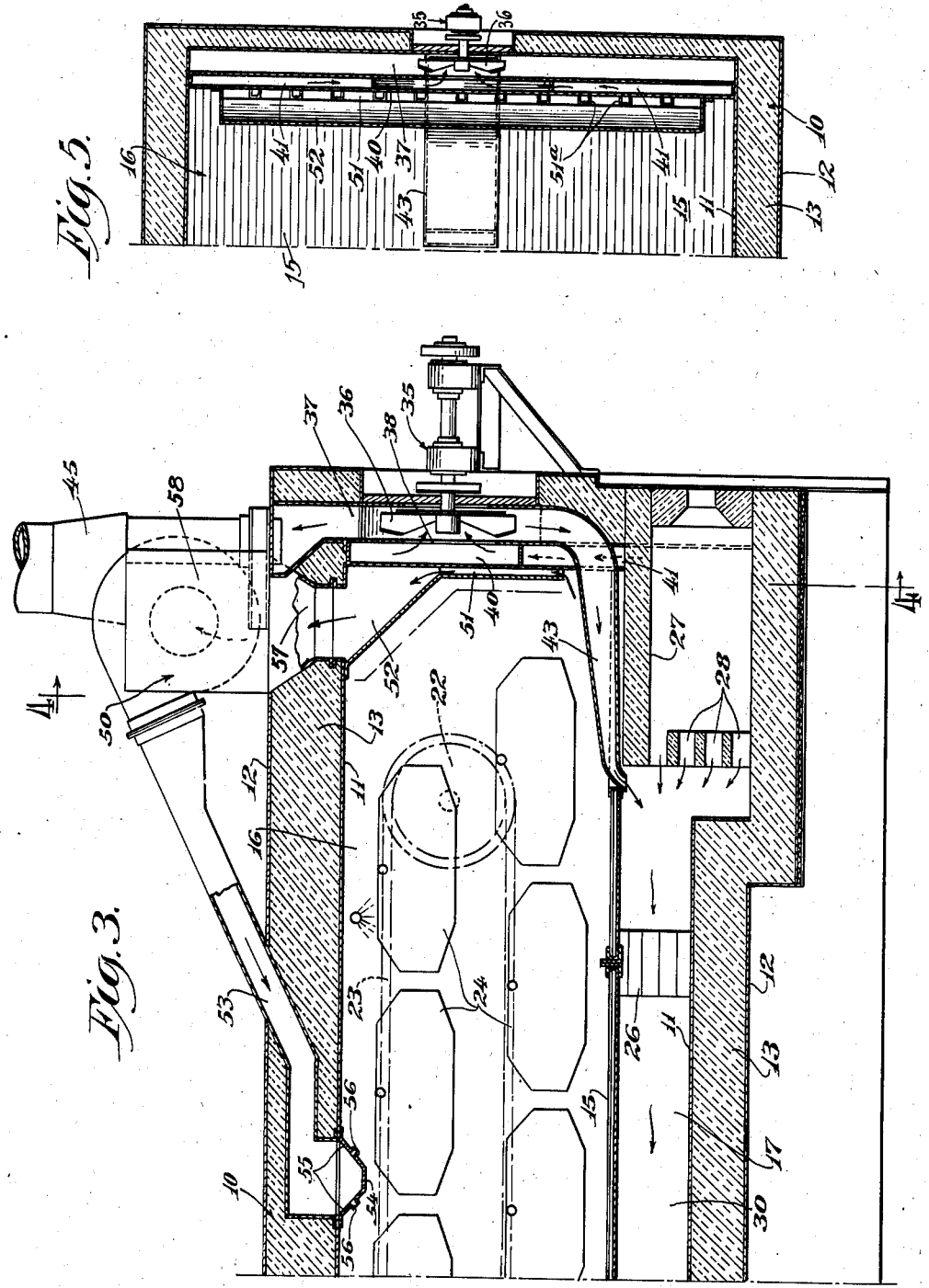
Inventor:
John V. Cook
By Bair and Freeman
Attorneys.

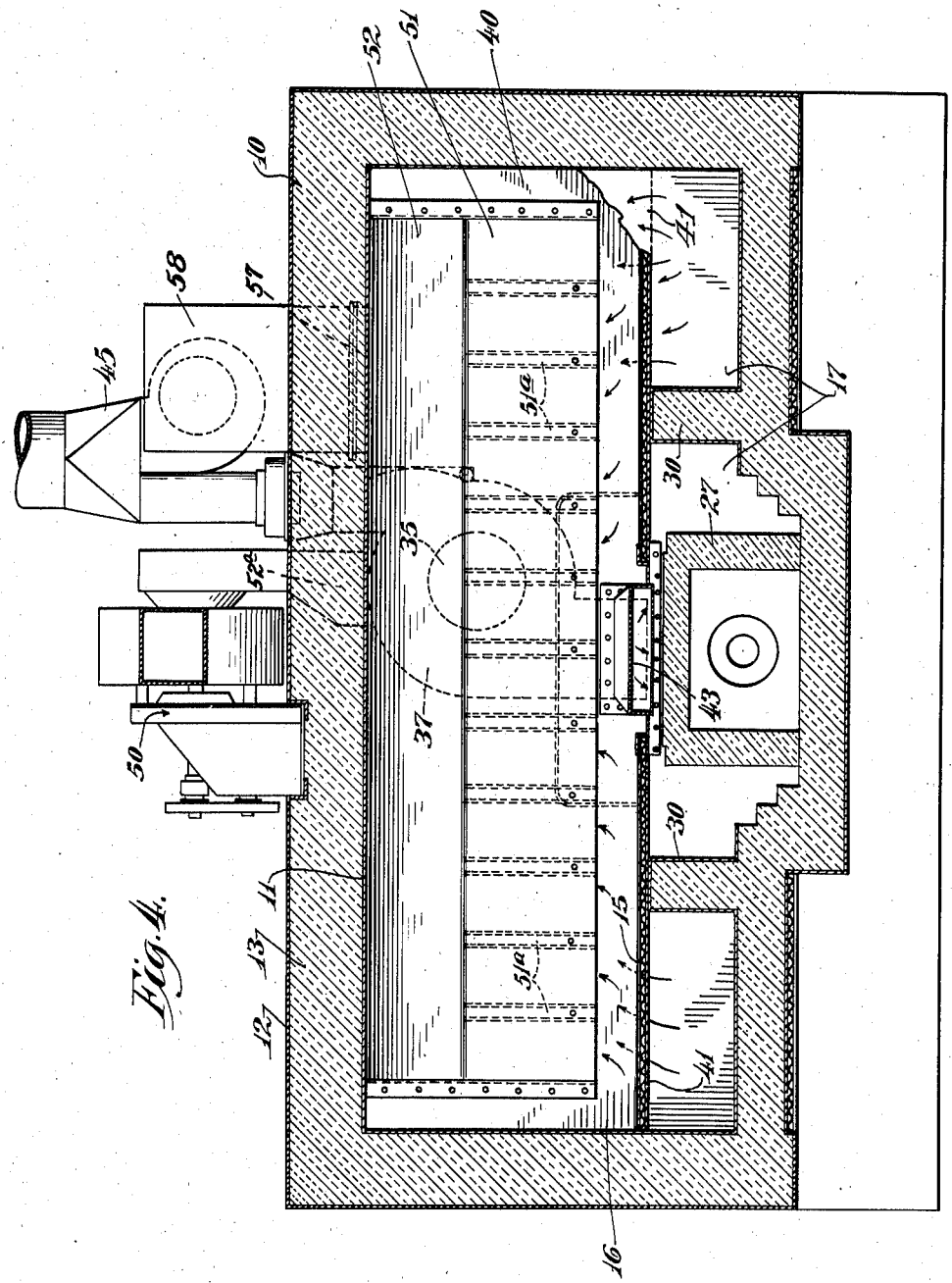

Patented July 14, 1942

2,289,629

UNITED STATES PATENT OFFICE 2,289,629

OVEN CONSTRUCTION

John V. Cook, Chicago, Ill., assignor to Petersen Oven Company, Chicago, Ill., a corporation of Illinois Application January 21, 1941, Serial No. 375,309

14 Claims. (Cl. 107—57)

The present invention relates to commercial type baking ovens wherein a plurality of units of food stuffs, such as loaves of bread, pastries, etc., are simultaneously subjected to a baking operation.

More specifically, the present invention is directed to an oven construction of the type wherein the oven chamber is provided with a partition, formed of sheet metal, to divide the oven chamber into a baking chamber and a heating chamber, the baking chamber being indirectly heated by the radiated heat from said sheet metal partition.

One of the objects of my invention resides in the provision of an improved arrangement of means for circulating heat in the heating chamber so that the heated air and gases emanating directly from the heating apparatus per se are recirculated through the heating system to utilize the major portion of heat energy thereof for heating of the sheet metal partition and thereby indirectly heating the baking chamber.

Another object is to provide an improved oven construction of the character indicated characterized by the provision of means for causing forced agitation and circulation of the heated air and gases within the heating chamber for more uniformly heating the sheet metal partition, by virtue of which the baking chamber is indirectly heated.

A further object is to provide an improved baking oven characterized by the provision of means for causing the heated air and gases within the heating chamber to travel in a predetermined path, together with the provision of means for causing forced agitation and circulation of said heated air and gas within the heating chamber.

A still further object of this invention is to provide separate means associated with the respective baking and heating chambers by virtue of which the heated air and gases are withdrawn from one portion of the said chambers and forcibly injected into said respective chambers at another portion thereof, thereby causing agitation and forced circulation of the air and gases within the respective chambers.

Still another object of my invention is to provide an improved, relatively simple oven construction of the general type indicated, which is relatively inexpensive to manufacture and embody in an oven structure, and which includes novel construction and arrangement of means for effecting forced circulation of the heated air and gases within the heating chamber by virtue of which the life of the heating apparatus is prolonged.

Other objects and advantages of this invention will be apparent from the following description, taken in connection with the accompanying drawings, in which:

Figure 3 is an enlarged fragmentary longitudinal vertical section of the rear end portion of the baking oven;

Figure 4 is a transverse staggered vertical section through the oven structure, taken substantially as indicated at line 4—4 on Figure 3; and Figure 5 is a transverse horizontal section through the rear end portion of the oven, taken substantially as indicated at line 5—5 on Figure 1.

Figure 1:
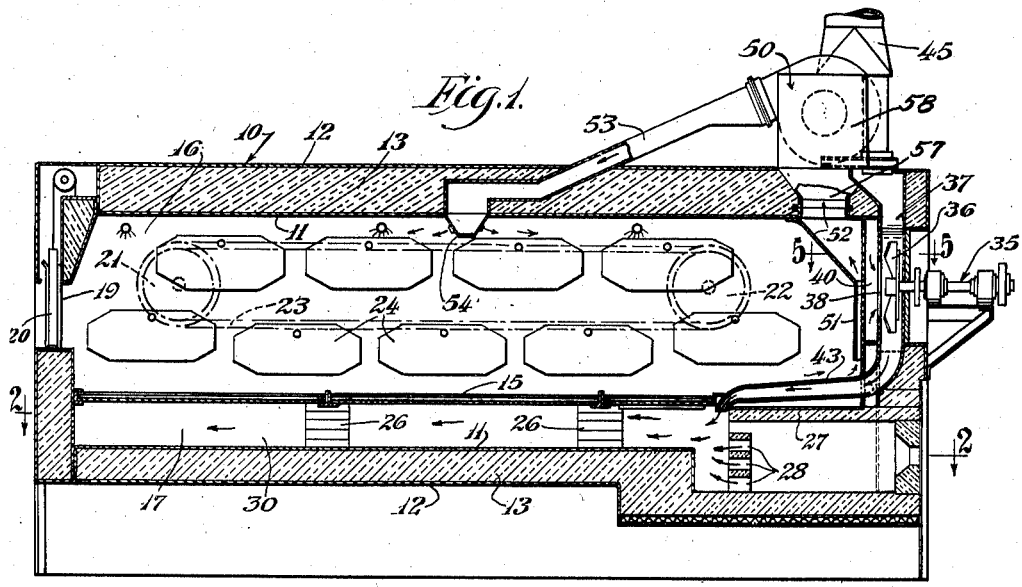
Figure 1 is a longitudinal vertical section through a baking oven provided with apparatus embodying the present invention.

The oven structure illustrated in the drawings is of generally rectangular shape and of the low height type, including a housing 10, the walls of which are composed of two spaced apart inner and outer sheets of metal indicated at 11 and 12 respectively, between which suitable heat insulating material, indicated at 13, is interposed. The interior of the oven is in the form of a relatively large chamber in which is disposed a substantially horizontally extending partitioning means, in the form of a corrugated plate 15, which divides said chamber into an upper baking chamber 16 and a lower heating chamber 17. The forward end of the baking chamber 16 is provided with an opening 19 to afford convenient access to the interior of said chamber, said opening being adapted to be closed by a door 20 of conventional form.

Within the baking chamber 16 I have shown diagrammatically an endless conveyor of conventional form, including a pair of transversely spaced apart sprocket wheels, designated at 21 and 22, at the forward and rearward ends respectively of the baking chamber, and over which wheels are trained suitable chains indicated diagrammatically at 23, from which are suspended trays 24 adapted to receive and support thereon the pans containing the bread or other foodstuffs during their course of travel through the baking chamber.

Figure 2:
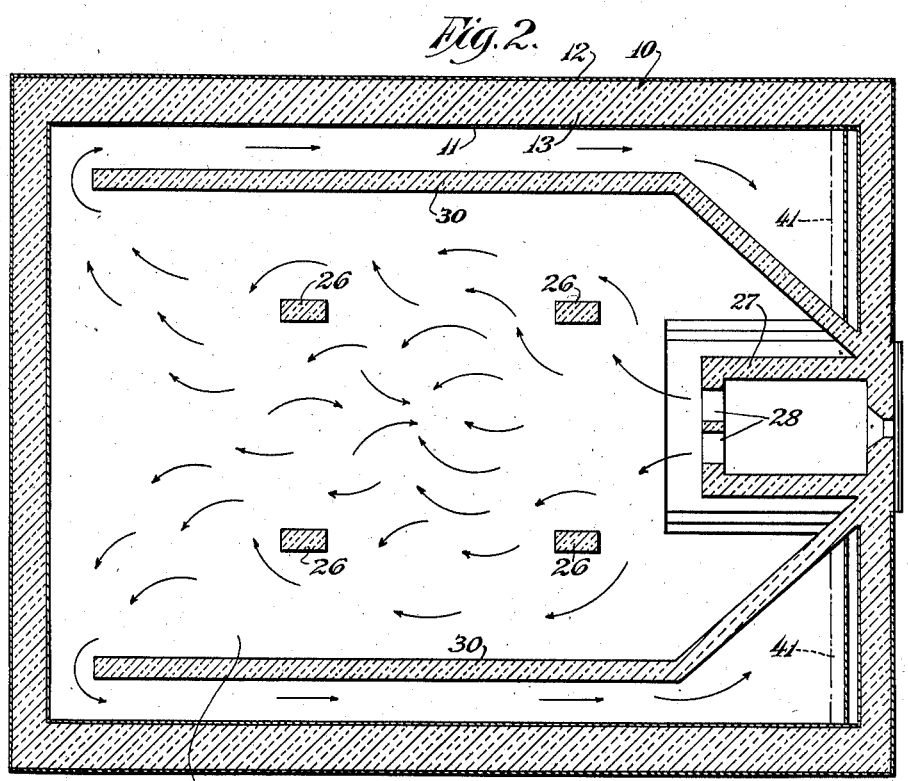
Figure 2 is a horizontal sectional view through the heating chamber, taken substantially as indicated at line 2—2 on Figure 1.

The baking chamber is heated indirectly by the radiated heat from the corrugated partitioning plate 15, which plate is secured at its marginal edges to the sheet metal plates 11, forming the inner walls of the oven proper, so as to completely separate the baking chamber relatively to the heating chamber, and thereby preclude entry into the baking chamber of gases and by-products of combustion, circulating in the heating chamber. To facilitate fabrication, handling and assembly said partitioning plate 15 is made up of a plurality of sections, joined together to form a single panel or partition wall. To assist in properly supporting the partitioning plate in the oven chamber, I provide a plurality of pillars or supports indicated at 26, located in the central portion of the heating chamber 17, as seen in Figure 2.

It is to be understood that the heating chamber is heated directly by any suitable form of heating apparatus, such as a gas burner, oil burner, or a coal fired heating unit, and in the drawings said heating means is not disclosed other than a showing of a housing, indicated at 27, in which the heating means may be located. Said housing 27 is formed of ceramic or other suitable form of refractory material, and the end wall thereof extending into the heating chamber is formed with a multiplicity of openings or ducts indicated at 28 through which the heat from the heating means may emanate directly into said heating chamber.

To insure movement of the heated air and gases within the heating chamber in a predetermined path I provide a pair of auxiliary partitioning walls 30, extending longitudinally of the chamber and connecting the bottom of the heating chamber and the partitioning plate 15. Said auxiliary walls 30 are disposed in close spaced apart relation to the respective side walls of the oven body, to form passageways, and as may be seen in Figure 2 of the drawings, said walls 30 terminate at the rear end of the oven in converging relation to the housing 27 of the heating means, the opposite ends of said walls terminating in spaced apart relation to the forward end wall of the oven proper.

The heated air and gases within the heating chamber 17 are forcibly agitated and caused to travel forwardly in the central portion of the heating chamber, intermediate the auxiliary partition walls 30, and thence rearwardly in the passageways between said walls 30 and the outer walls of the oven, and are withdrawn at the rearward portion of said passageways and again forcibly injected into the central portion of the heating chamber, for recirculation therein and causing substantial agitation of the heated air and gases within said chamber, thereby utilizing a relatively high percentage of heat energy from said air and gases, for imparting uniform heat to the partition plate 15.

The means for withdrawing and again injecting the heated air and gases into the heating chamber for recirculation therein is in the form of suction-blower apparatus, indicated generally at 35 and which comprises a power driven fan 36 disposed in a fan chamber 37 mounted adjacent the rear end wall of the baking chamber. Mounted immediately in front of said fan chamber, and in communication therewith through an opening 38, in alignment with said fan, is a header chamber 40 extending substantially across the entire width of the baking chamber. The lower end of said header chamber, at opposite sides of the heating means, is open, forming a pair of elongated ducts indicated at 41, opening through the partitioning plate 15 for communication with the rear end portions of said passageways of said heating chamber, intermediate the partitioning walls 30 and the side and rear end walls of the oven, as seen in Figure 2, and constituting discharge conduits for removal of the air and gases in the heating chamber. The lower portion of the fan chamber merges into a flat duct 43, of elongated cross section, extending forwardly and substantially centrally from the rear end of said baking chamber, and having its discharge end projecting downwardly through the partition plate 15, immediately forwardly of the housing 27 of the heating means, as seen in Figure 3 of the drawings.

It will now be apparent that the heated air and gases within the heating chamber 17 are forced to travel in a forwardly direction, as indicated by the arrows in Figures 2 and 3, toward the forward end of the oven, in the central area intermediate the auxiliary partition walls 30, and thence rearwardly in the passageways intermediate said partition walls 30 and the side walls of the oven proper for discharge upwardly through the ducts 41 into the header chamber 40. The heated air and gases are withdrawn from the header 40, through the opening 38, by action of the fan 36 and are forcibly blown downwardly through the duct 43 into the central portion of the heating chamber. The discharge end of the inlet duct is so related with respect to the housing of the heating means, as seen in Figure 3 of the drawings, that the air and gases being discharged through said duct immediately mix and co-mingle with the streams of heated air and gases emanating from the heating means, and causes agitation and circulation thereof, so as to more uniformly distribute the heat to the partitioning plate 15.

Associated with the upper end of the fan chamber 37 is a stack 45, which may be provided with a suitable damper (not shown), so as to permit discharging through said stack of a predetermined proportion of the heated air and gases being withdrawn from the heating chamber 17, through the ducts 41. By virtue of this arrangement the amount of heated air and gases that are permitted to be discharged may be controlled as desired so as to continuously recirculate the heated air and gases in the heating chamber for heating partition plate 15, uniformly and efficiently. This arrangement results in an efficient heating construction which prolongs the life of the heating apparatus of the oven.

Another important advantage that results from the use of a sheet metal plate 15 as the partitioning means between the baking chamber 16 and the heating chamber 17, is that said plate, made up in sections, is supported in a manner so that in the event of an explosion in the heating chamber, due to various conditions, one or more sections of said partitioning plate will be permitted to buckle or be displaced, so as to accommodate the force of the explosion, without materially impairing or damaging the oven structure proper.

It has also been found highly desirable that the air and gases within the baking chamber 16 be agitated so as to uniformly distribute the heat throughout said chamber and thereby obtain uniform browning of the exposed portion of loaves of bread, etc., and for accomplishing said agitation of the heated air and gases within the baking chamber, I provide suction-blower apparatus indicated generally at 50, mounted on the top of the oven proper adjacent the rear end thereof. Said suction blower apparatus includes an outlet duct 51 and 52, for removing the heated air and gases from the baking chamber, and an inlet duct 53, for forcibly injecting said air and gases into another portion of said baking chamber. Said duct 51 is of flat elongated cross section, extending substantially across the width of the baking chamber, and mounted directly against the header chamber 40, with the upper end merging into the funnel-shaped duct 52, connecting by duct 52ª directly to the suction side of said suction-blower apparatus 50. The duct 51 is divided up into the multiplicity of small vertical ducts by channel members 51ª which serve to provide reinforcement and proper spacing of the front wall of the duct relatively to the front wall of the header chamber 40. The lower end of the flat duct 51 is open throughout its length and terminates in close proximity to the bottom or lower portion of the baking chamber, as seen in Figure 3 of the drawings.

By virtue of this arrangement the air and gases, drawn upwardly by the suction-blower apparatus 50 through the duct 51—52—52ª, are caused to pass in direct contact with the wall of header chamber 40 and thereby absorb heat therefrom, and discharge through the duct 53 which opens into a discharge nozzle indicated generally at 54, recessed into the underside of the upper wall of the baking chamber, preferably adjacent the middle of the length of said chamber. Said nozzle is of the closed type including a pair of oppositely extending obliquely disposed walls 55, provided with a multiplicity of apertures 56 through which the air and gases are discharged into the upper portion of the baking chamber, toward opposite ends thereof, as indicated by the arrows in Figures 1 and 3 of the drawings.

It will now be apparent that the heated air and gases within the baking chamber are maintained in an agitated condition and are continuously recirculated in the chamber by means of said blower apparatus, thereby insuring maintenance of substantially uniform temperatures throughout the baking chamber, for obtaining proper coloring or browning of the exposed portions of the food stuffs, etc., being baked in said chamber.

Opening off of the upper end of the funnel-shaped duct 52, at one side of duct 52ª, is a duct 57, connecting to a chamber 58, which in turn is in communication with the stack 45. This construction permits discharge into the stack 45 of a portion of the heated air and gases circulating in the baking chamber 16.

The separate suction-blower apparatus employed for causing forced circulation and agitation of the air and gases within the respective heating and baking chamber provides an efficient, relatively simple, inexpensive construction which is economical in use, and which is especially suitable for adaptation in oven constructions of relatively low height for use in installations where low ceilings are limiting factors.

Although I have herein shown and described a preferred embodiment of my invention, manifestly it is capable of modification and rearrangement without departing from the spirit and scope thereof. I do not, therefore, wish to be understood as limiting this invention to the precise form herein disclosed, except as I may be so limited by the appended claims.

I claim as my invention:

1. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, and means for removing the heated air and gases from one portion of the heating chamber and forcibly injecting same into another portion of said heating chamber for causing a circulation and agitation of the air and gases in said chamber for more uniformly distributing heat to said partitioning means.

2. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, and suction-blower apparatus including outlet and inlet ducts communicating with different portions of the heating chamber, whereby heated air and gases are removed from one portion of the chamber and injected into another portion of the heating chamber, for effecting circulation and agitation of said air and gases in said chamber.

3. In a baking oven, the combination of partitioning means within said oven to provide a baking chamber and a heating chamber therein, means for directly heating the air and gases in the latter chamber, said partitioning means constituting a heat radiating surface for indirectly heating the baking chamber, and suction-blower apparatus including a pair of outlet ducts and an inlet duct communicating with said heating chamber, the outlet ducts being located adjacent the outer portions of the chamber and the inlet duct being located adjacent the central portion of said chamber, whereby to produce circulation and agitation of the air and gases in the chamber for effecting more uniform distribution of heat to said partitioning means.

4. In a baking oven, the combination of partitioning means within said oven to provide a baking chamber and a heating chamber therein, means for directly heating the air and gases in the latter chamber, said partitioning means constituting a heat radiating surface for indirectly heating the baking chamber, and suction-blower apparatus including a pair of outlet ducts and an inlet duct communicating with said heating chamber, the outlet ducts being located in such relation to the heating means to inject a stream of air and gases into the path of travel of the stream of air and gases emanating from the heating means, to cause agitation and circulation of the air and gases in said heating chamber.

5. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, suction-blower apparatus including outlet and inlet ducts communicating with the heating chamber for removing heated air and gases from one portion of the chamber, and auxiliary partition walls within the heating chamber for causing said air and gases to travel in a predetermined path.

6. In a baking oven, the combination of partitioning means within the oven to provide a baking chamber and a heating chamber therein, means for directly heating the air and gases in the latter chamber, said partitioning means constituting a heat radiating surface for indirectly heating the baking chamber, auxiliary partitioning means within the heating chamber, including a pair of walls disposed in spaced relation to the side walls of the chamber, and terminating in spaced relation to the end wall of said chamber, to provide direct communication of the central area between said pair of walls with said heating means, and suction-blower apparatus including outlet and inlet ducts in communication with the heating chamber, the outlet duct being in communication with the area intermediate one of said auxiliary partition walls and the side wall of the oven, and the inlet duct being in direct communication with the central area of said heating chamber, intermediate the pair of partition walls.

7. In a baking oven, the combination of partitioning means within the oven to provide a baking chamber and a heating chamber therein, means for directly heating the air and gases in the latter chamber, said partitioning means constituting a heat radiating surface for indirectly heating the baking chamber, auxiliary partitioning means within the heating chamber, including a pair of walls disposed in spaced relation to the side walls of the chamber, and terminating in spaced relation to the end wall of said chamber, to provide direct communication of the central area between said pair of walls with said heating means, and suction-blower apparatus including a pair of outlet ducts and an inlet duct, said outlet ducts being connected in direct communication with the respective areas intermediate said auxiliary partition walls and the side walls of the chamber, and the inlet duct being connected in direct communication with the central area of chamber, intermediate said pair of auxiliary partition walls.

8. In a baking oven, the combination of partitioning means within the oven to provide a baking chamber and a heating chamber therein, means for directly heating the air and gases in the latter chamber, said partitioning means constituting a heat radiating surface for indirectly heating the baking chamber, auxiliary partitioning means within the heating chamber, including a pair of walls disposed in spaced relation to the side walls of the chamber, and terminating in spaced relation to the end wall of said chamber, to provide direct communication of the central area between said pair of walls with said heating means, suction-blower apparatus including a pair of outlet ducts and an inlet duct, said outlet ducts being connected in direct communication with the respective areas intermediate said auxiliary partition walls and the side walls of the chamber, and the inlet duct being connected in direct communication with the central area of chamber, intermediate said pair of auxiliary partition walls, and a stack connected to said suction-blower apparatus for discharging a portion of said air and gases withdrawn from said heating chamber through said outlet ducts.

9. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, and means for forcibly agitating the air and gases within the baking chamber for effecting uniform distribution of heat therein.

10. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, and means for removing air and gases from one portion of the baking chamber and forcibly injecting them into another portion of said chamber for causing circulation and agitation of the air and gases therein.

11. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, and means for removing air and gases adjacent the lower portion of the baking chamber and forcibly injecting the same into the upper portion of said chamber.

12. In a baking oven, the combination of partitioning means within said oven to provide a baking chamber and a heating chamber therein, means for directly heating the air and gases in the latter chamber, said partitioning means constituting a heat radiating surface for indirectly heating the baking chamber, suction-blower apparatus having outlet and inlet ducts communicating with the heating chamber for effecting agitation and circulation of the air and gases in said chamber, a header disposed in and extending transversely of the baking chamber, adjacent the rear end, and connected to said outlet duct and having an opening communicating with the inlet duct, and separate suction-blower apparatus having outlet and inlet ducts communicating respectively with the lower and upper portions of the baking chamber for agitating and circulating the air and gases in said baking chamber, said last-mentioned outlet duct being disposed directly against said header so that air and gases passing through said duct may absorb heat from said header.

13. In a baking oven, the combination of horizontally disposed partitioning means within said oven to provide an upper baking chamber and a lower heating chamber therein, means for directly heating the air and gases in the latter chamber, said partitioning means constituting a heat radiating surface for indirectly heating the baking chamber, and means for removing air and gases adjacent the lower portion of the baking chamber and forcibly injecting the same into the upper portion of said chamber, said means including a discharge nozzle adjacent the upper portion of the chamber and intermediate the ends thereof, said nozzle being constructed and arranged for discharging the air and gases in opposite directions toward the respective ends of the chamber.

14. In a baking oven, the combination of partitioning means within the oven to provide a baking chamber and a heating chamber therein, means for directly heating the air and gases in the latter chamber, said partitioning means constituting a heat radiating surface for indirectly heating the baking chamber, auxiliary partitioning means within the heating chamber, including a pair of walls disposed in spaced relation to the side walls of the chamber, and terminating in spaced relation to the end wall of said chamber, to provide direct communication of the central area between said pair of walls with said heating means, and suction-blower apparatus including outlet and inlet ducts in communication with the heating chamber, the outlet duct being in communication with the area intermediate one of said auxiliary partition walls and the side wall of the oven, and the inlet duct being in direct communication with the central area of said heating chamber, intermediate the pair of partition walls, said central area being greater in cross-sectional area than the sum of the cross-sectional areas between said auxiliary partition walls and the side walls of the heating chamber.

JOHN V. COOK.